(12) United States Patent
Black et al.

(10) Patent No.: US 12,515,752 B2
(45) Date of Patent: Jan. 6, 2026

(54) MOTORCYCLE STAND

(71) Applicant: BLACK MC PTY LTD, Toowong (AU)

(72) Inventors: Stuart Black, Toowong (AU); Stephen McGuiness, Toowong (AU)

(73) Assignee: BLACK MC PTY LTD, Toowong (AU)

( * ) Notice: Subject to any disclaimer, the term of this patent is extended or adjusted under 35 U.S.C. 154(b) by 460 days.

(21) Appl. No.: 18/003,238

(22) PCT Filed: Jun. 24, 2021

(86) PCT No.: PCT/AU2021/050664
§ 371 (c)(1),
(2) Date: Dec. 23, 2022

(87) PCT Pub. No.: WO2021/258151
PCT Pub. Date: Dec. 30, 2021

(65) Prior Publication Data
US 2023/0264769 A1    Aug. 24, 2023

(30) Foreign Application Priority Data

Jun. 25, 2020   (AU) .............................. 2020902122

(51) Int. Cl.
*B62H 3/04*    (2006.01)
*B60B 19/00*    (2006.01)

(52) U.S. Cl.
CPC .............. *B62H 3/04* (2013.01); *B60B 19/003* (2013.01)

(58) Field of Classification Search
CPC ............... B62H 3/04; B62H 1/02; B62H 3/06
(Continued)

(56) References Cited

U.S. PATENT DOCUMENTS 5,735,410 A * 4/1998 Kallstrom ................. B60R 9/10
                                                        211/20
6,488,157 B2 * 12/2002 Chen ....................... B66F 3/005
                                                        211/20
(Continued)

FOREIGN PATENT DOCUMENTS

WO        2016011483 A1    1/2016

OTHER PUBLICATIONS

International Search Report and Written Opinion issued on Sep. 2, 2021, in corresponding International Application No. PCT/AU2021/050664, 9 pages.

*Primary Examiner* — Hau V Phan
(74) *Attorney, Agent, or Firm* — Maier & Maier, PLLC

(57) ABSTRACT

A motorcycle stand to lift and support a tyre of a motorcycle or motor scooter off the ground includes: a frame having first and second posts to extend along each side of a motorcycle wheel, and an interconnecting member extending transversely relative to the first and second posts; first and second motorcycle stand wheels coupled to ends of the first and second arms respectively and arranged for placement on opposite sides of the motorcycle and coaxial and aligned with the major axis parallel with the axes of the motorcycle wheels; a third motorcycle stand wheel mounted to the interconnecting member, and a self-engaging latching arrangement coupled with a respective frame engaging bracket, where at least one of each bracket and latching arrangement is supported on each of the first and second posts to engage mounting members provided on a frame or suspension members of the motorcycle or motor scooter.

21 Claims, 12 Drawing Sheets

(58) Field of Classification Search
USPC .......................................................... 280/296
See application file for complete search history.

(56) References Cited

U.S. PATENT DOCUMENTS

| | | | | |
|---|---|---|---|---|
| 6,836,942 B2* | 1/2005 | Oleski | ................... | B60B 29/001 29/434 |
| 7,000,901 B1* | 2/2006 | VanValkenburgh | .... | B66F 15/00 254/131 |
| 7,100,928 B1* | 9/2006 | VanValkenburgh | .... | B66F 3/005 280/166 |
| 8,371,598 B2* | 2/2013 | VanValkenburgh | .... | B25B 13/04 411/533 |
| 8,485,369 B2* | 7/2013 | Glover | .................... | B60P 3/073 211/24 |
| 9,180,922 B2 | 11/2015 | Glover | | |
| 9,610,993 B1* | 4/2017 | Ho | ........................... | B62H 3/06 |
| 9,981,502 B2* | 5/2018 | Souder | .................. | B60B 29/001 |
| 10,266,005 B2* | 4/2019 | Souder | .................... | B60B 30/02 |
| 2019/0061848 A1* | 2/2019 | Risley | ....................... | B62H 1/02 |

* cited by examiner

MOTORCYCLE STAND

TECHNICAL FIELD

The present invention relates to a motorcycle rear stand.

BACKGROUND

Any references to methods, apparatus or documents of the prior art are not to be taken as constituting any evidence or admission that they formed, or form part of the common general knowledge.

A motorcycle rear stand functions to move the rear end of a motorcycle between a first position in which both wheels of the motorcycle are on the ground and a second position in which the rear end of the motorcycle including the rear wheel are elevated above the ground. A problem associated with motorcycle rear stands is that parked or stored motorcycles normally are retained in an upright position by a kickstand, which causes the motorcycle to lean over in the direction of the kickstand. One prior art motorcycle rear stand has a frame which consists of a pair of parallel upright posts spaced a fixed distance apart by a main U-shaped member. Wheels are mounted near the bottom of the uprights and, at the top of the uprights, width-adjustable members (outriggers) with V- or U-shaped bike engagement features adapted to engage with spool-shaped projections which are mounted on opposite sides of a motorcycle rear axle or rear suspension swingarm. The distance between the pair of V- or U-shaped bike engagement features is adjusted to space them a fixed distance equal to the distance between the spools mounted on opposite sides of the motorcycle. A handle member attaches to the main U-shaped member, remote from the bike engagement members.

In order to use the prior art motorcycle rear stand, the U- or V-shaped bike engagement members have to be carefully aligned in close proximity to the spools which are mounted on opposite sides of a motorcycle rear axle or swingarm prior to lifting the rear end of the motorcycle.

A motorcycle supported on a side stand leans at an angle such that the vertical axis of the motorcycle is not perpendicular to the ground. With the motorcycle supported on e its kickstand, the prior art motorcycle rear stand cannot properly align the U- or V-shaped bike engagement members with the spools which are mounted on opposite sides of a motorcycle rear axle or rear swingarm prior to lifting the bike inasmuch as the angled position of the motorcycle causes the spool on the kickstand side of the motorcycle to be lower in elevation above the ground than the spool on the opposite side of the motorcycle. Consequently, the prior art rear stand cannot commence to elevate the rear of a motorcycle on a kickstand because it can engage only the lower, kickstand side spool and has no control over the spool on the opposite side. Lifting the motorcycle in this condition would cause it to tip over if the operator does not actively align the bike engagement member with the spool on the opposite side as that spool converges with the corresponding engagement member.

The use of conventional paddock stands used for supporting and lifting motorcycles typically involves a series of steps. The initial step requires the user to adjust the distance between the U- or V-shaped bike engagement members (outriggers) on the stand to substantially match the distance between the spools (or bobbins or other mounting arrangements provided on the motorcycle). This process is usually carried out by lifting the paddock stand (at an angle that matches the motorcycle) to gauge the (fixed) distance between the spools on the motorcycle before adjusting the outriggers on the stand accordingly. The next step of using the paddock stand to bring the motorcycle into a vertical position involves a combination of pushing the motorcycle in a lateral direction so that the motorcycle is no longer supported on the side stand and simultaneously applying an upward force via the leverage provided by the paddock stand on the left spool of the motorcycle (which is at a lesser height since the motorcycle is leaning toward left side). This step is dangerous because the motorcycle is balanced vertical by the user with his left hand (since the motorcycle side stand is no longer contacting the ground), and the user is trying keep the left spool engaged with the fork on the left outrigger of the paddock stand whilst trying to align the right spool with the fork on the right outrigger, which is typically done by the user by swivelling the stand around using their right hand.

In at least some embodiments, the presently described invention aims to address the dangers associated with using paddock stands problems associated with lifting a motorcycle leaning on a kickstand from the ground, to a position with the rear wheel spaced from the ground and the motorcycle in a vertical condition and thereafter returning the vehicle rear end to the ground and leaning the motorcycle back onto its kickstand while retaining control of the motorcycle at all times.

SUMMARY

In an aspect, the invention provides a motorcycle stand adapted to lift and support a wheel and/or axle of a motorcycle or motor scooter off the ground, the motorcycle stand comprising:
  a frame having first and second posts adapted in use to extend along each side of a motorcycle or motorscooter wheel, and an interconnecting member extending transversely relative to the first and second posts; first and second motorcycle stand wheels coupled to ends of the first and second posts respectively and arranged for placement on opposite sides of the motorcycle;
  a self-engaging latching arrangement coupled with a respective frame engaging bracket, wherein at least one of each frame-engaging bracket and self-latching arrangement is supported on each of said first and second posts to engage mounting members provided on said motorcycle or motor scooter.

In an embodiment, the self-engaging latching arrangement comprises a latching member mounted relative to the bracket to pivot, in use, towards respective lateral sides of the motorcycle or motor scooter to engage and retain said respective mounting members.

In an embodiment, the latching member is biased to pivot towards the bracket.

In an embodiment, the latching member comprises a guiding plate for guiding said mounting members into the bracket.

In an embodiment, the guiding plate is angled relative to the plane of the bracket to slope in a downwardly and inwardly direction towards the engaging portion of the bracket to guide the mounting member towards the engaging portion of the bracket.

In an embodiment, the self-engaging latching arrangement further comprises a locking portion positioned adjacent and preferably below said guiding plate such that upon engagement of the bracket with a first mounting portion of the mounting member, a second mounting portion of the mounting member is received and retained in said locking portion under biasing force applied by the biased latching plate.

In an embodiment, the guiding portion is located at a first end of the latching member which is located opposite relative to a second end of the latching member, the second end of the latching member being pivotally attached relative to the bracket to effect the pivotal movement of the guiding portion.

In an embodiment, the latching member comprises two spaced apart web members dimensioned to accommodate the bracket there-between.

In an embodiment, the web members extend transversely relative to a stop member connecting said web members wherein the stop member is positioned to limit extent of pivotal movement of the latch member in a direction away from the motorcycle wheel, during use.

In an embodiment, each web member, at a first end is connected with the stop member and the pivoting portion, and, at a second end is connected with said locking portion.

In an embodiment, the second end of the web member, during use, is located at an elevated position relative to the first end of the web member.

In an embodiment, the guiding plate is at a higher elevation relative to the locking portion to guide the mounting member along a guiding surface of the guiding in an in-use downwardly direction towards the frame engagement portion of the bracket.

In an embodiment, each bracket is supported on a bracket supporting member extending relative to the first or second post.

In an embodiment, the bracket supporting member extends transversely relative to in-use upper portions of the first or second posts.

In an embodiment, the latching member is pivotally attached to the bracket supporting member.

In an embodiment, the mounting member comprises a spool configured for being received into a spool receiving slot through an opening provided at an in use upper portion of the bracket.

In an embodiment, the first mounting portion is defined by a proximal flange and a distal flange with a bracket engaging surface extending therebetween.

In an embodiment, the second mounting portion comprises a locking pin projecting outwardly relative to the distal flange, the locking pin being dimensioned to be received and retained in the locking portion of the latching member.

In an embodiment, in at least one operable configuration, the latching portion is biased to retain the locking pin in the locking portion of the latching member.

In an optional embodiment, the mounting members are mounted on an axle assembly supporting one of said wheels of the motorcycle or motor scooter.

In another embodiment, the mounting members may be mounted on the frame or suspension members (swingarm) of the motorcycle or motor scooter.

In an embodiment, a third motorcycle stand wheel is mounted to the interconnecting member.

In an embodiment, the third motorcycle stand wheel mounted to the spacing member includes peripheral rotatable ground contact members for motion parallel to the major axis of the wheel. It would be understood that the third motorcycle stand wheel is not an essential feature and the motorcycle stand may be used without the inclusion of the optional third motorcycle stand wheel.

In an embodiment, the first, second and third motorcycle stand wheels comprise omni-directional wheels for motion in any horizontal direction, each of said omni-directional wheel being capable of multiple directional travel and comprising a central hub rotatable about a main axis and a number of independently mounted rotatable rollers located about a rim of the hub for allowing motion in any horizontal direction. Once again, it would be understood that the omni-directional wheels are not an essential feature and the motorcycle stand may be used without the inclusion of these optional omnidirectional wheels.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF THE EMBODIMENTS

Figure 1:
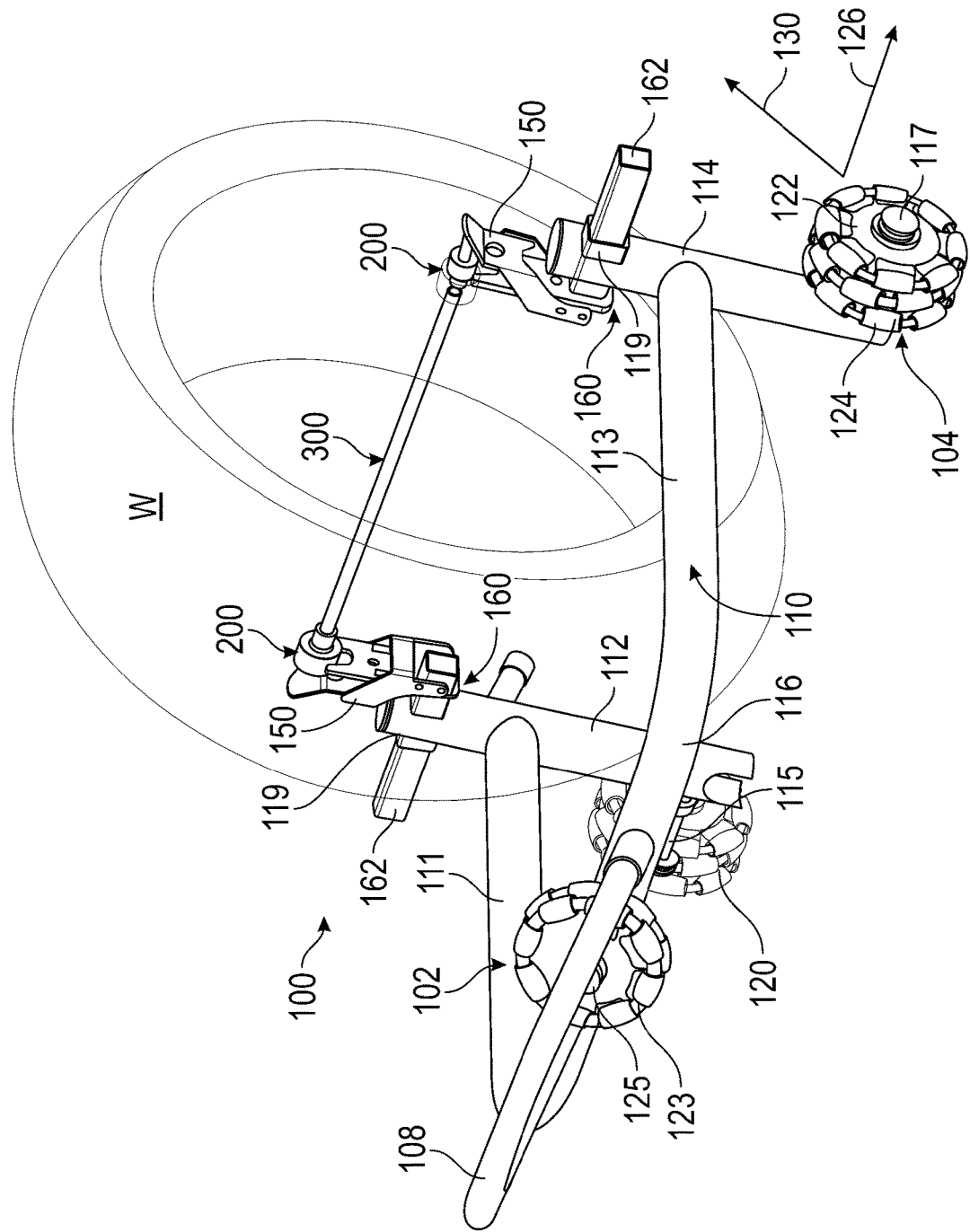
FIG. 1 is a perspective view of the motorcycle stand 100 in which the mounting members 200 have not been engaged with the bracket 160
Figure 2:
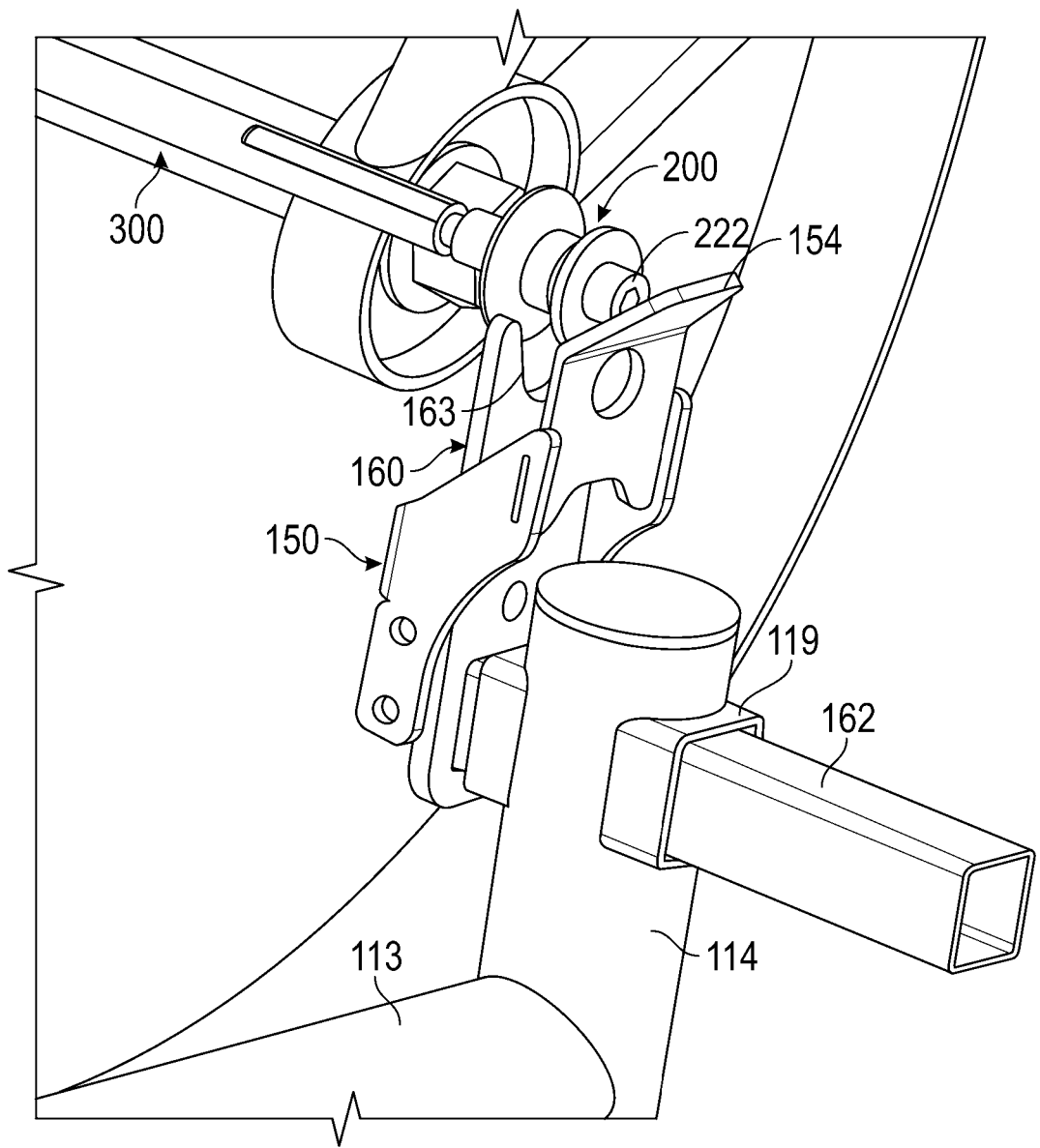
FIG. 2 is an enlarged view of the self-engaging latching arrangement 150 and the bracket 160.
Figure 3:
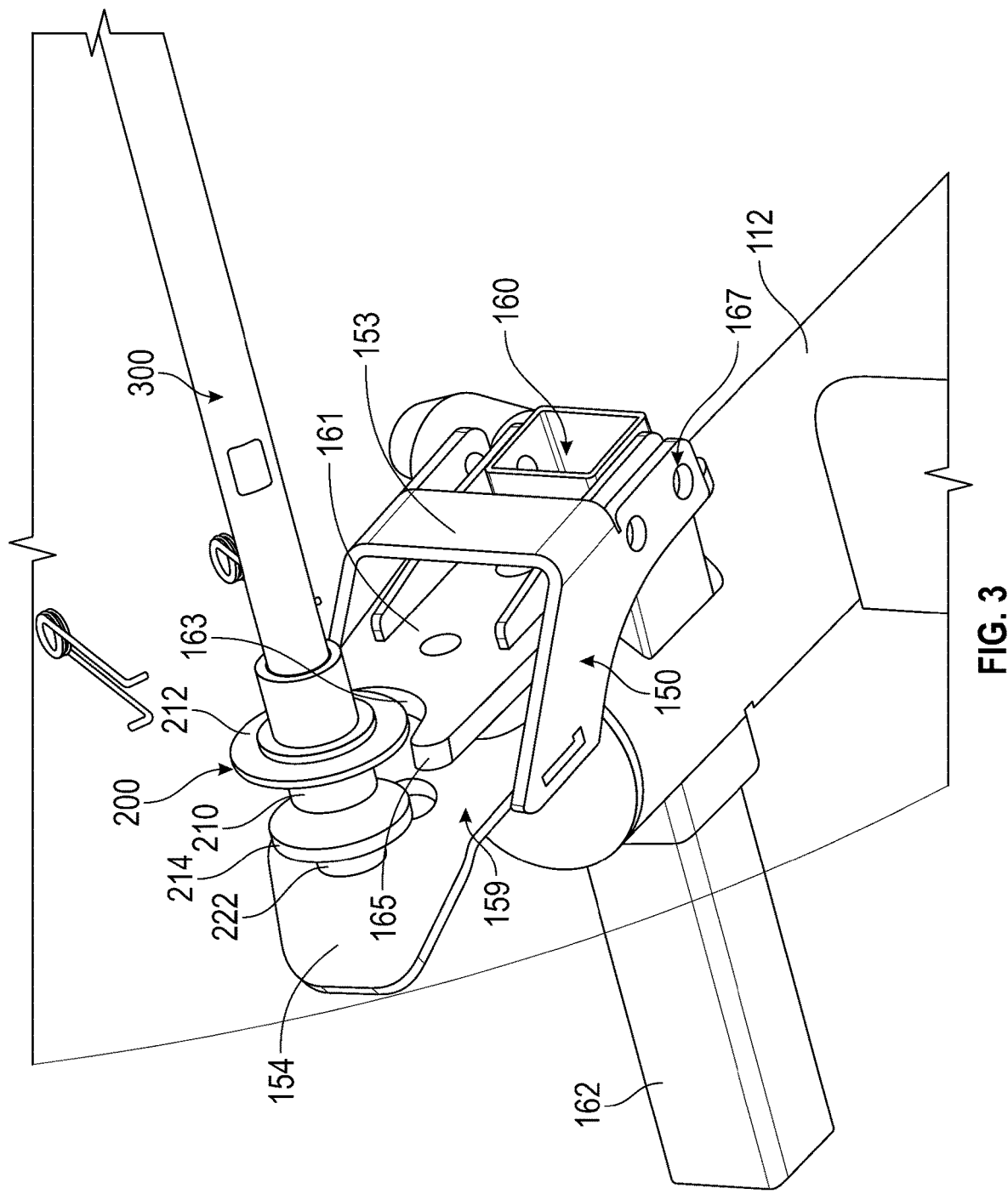
FIG. 3 is a top perspective view of the self-engaging latching arrangement 150 and the bracket 160 shown in FIG. 2.
Figure 4:
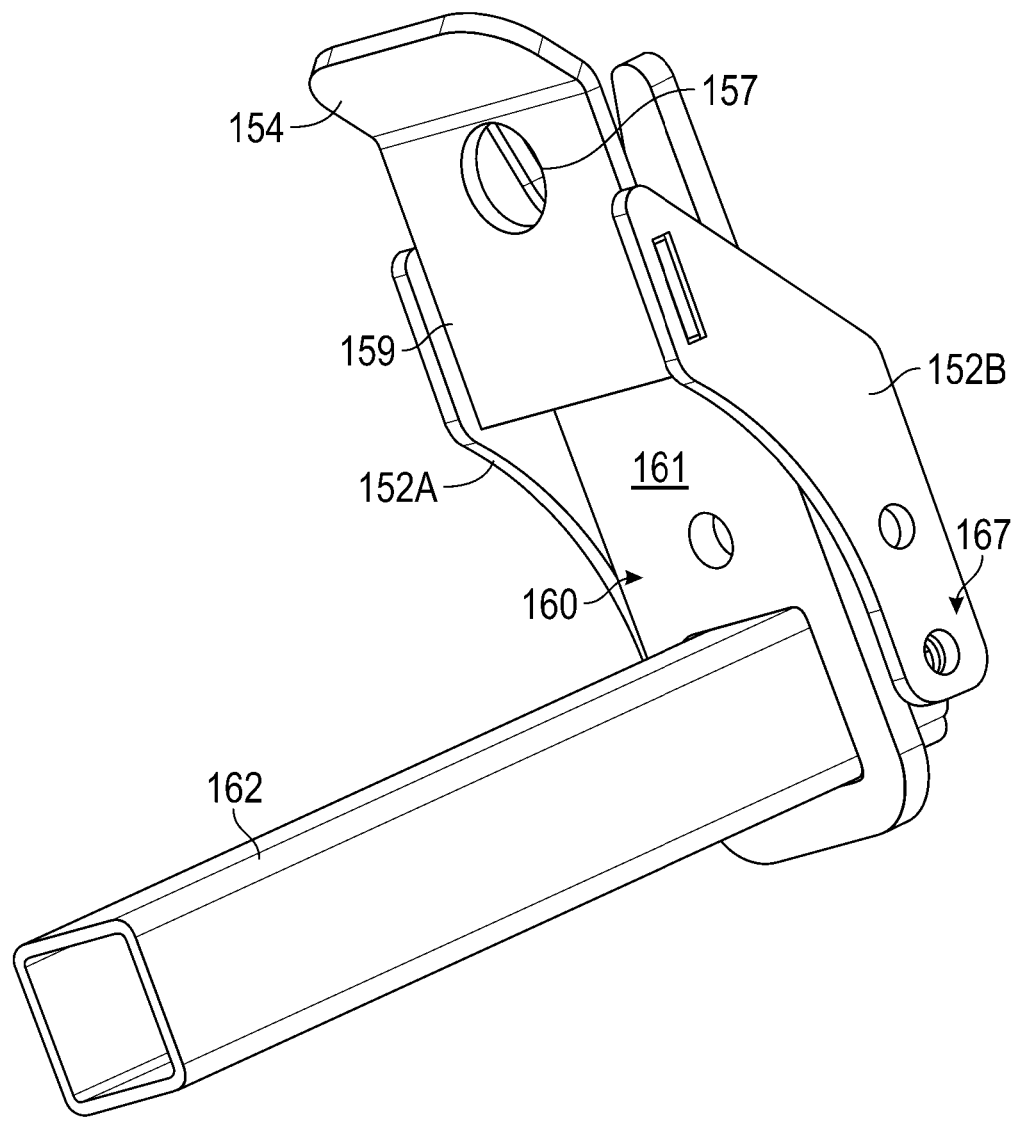
FIG. 4 is a first isolated perspective view of the bracket 160 with the self-engaging latching arrangement 150.
Figure 5:
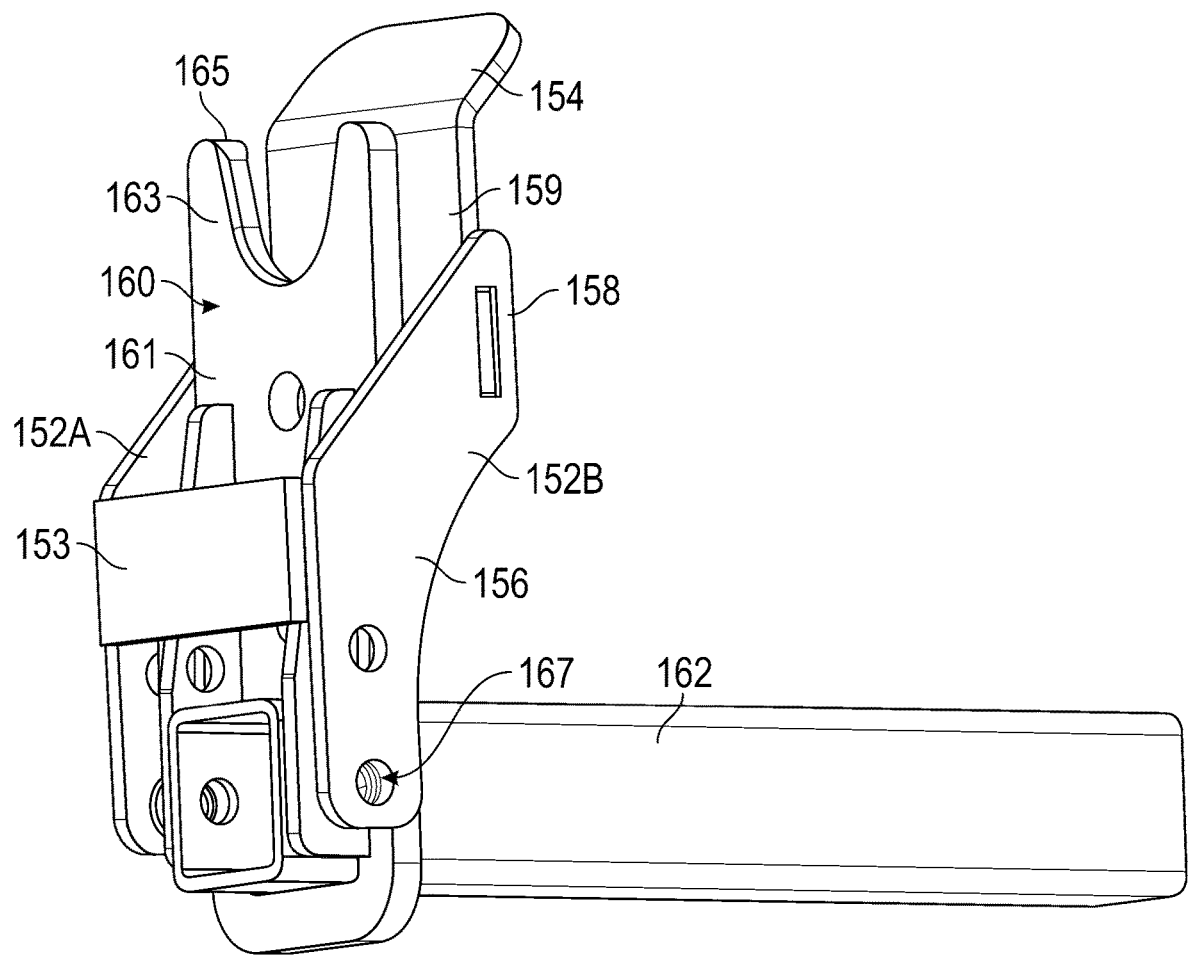
FIG. 5 a second isolated perspective view of the bracket 160 with the self-engaging latching arrangement 150.
Figure 6:
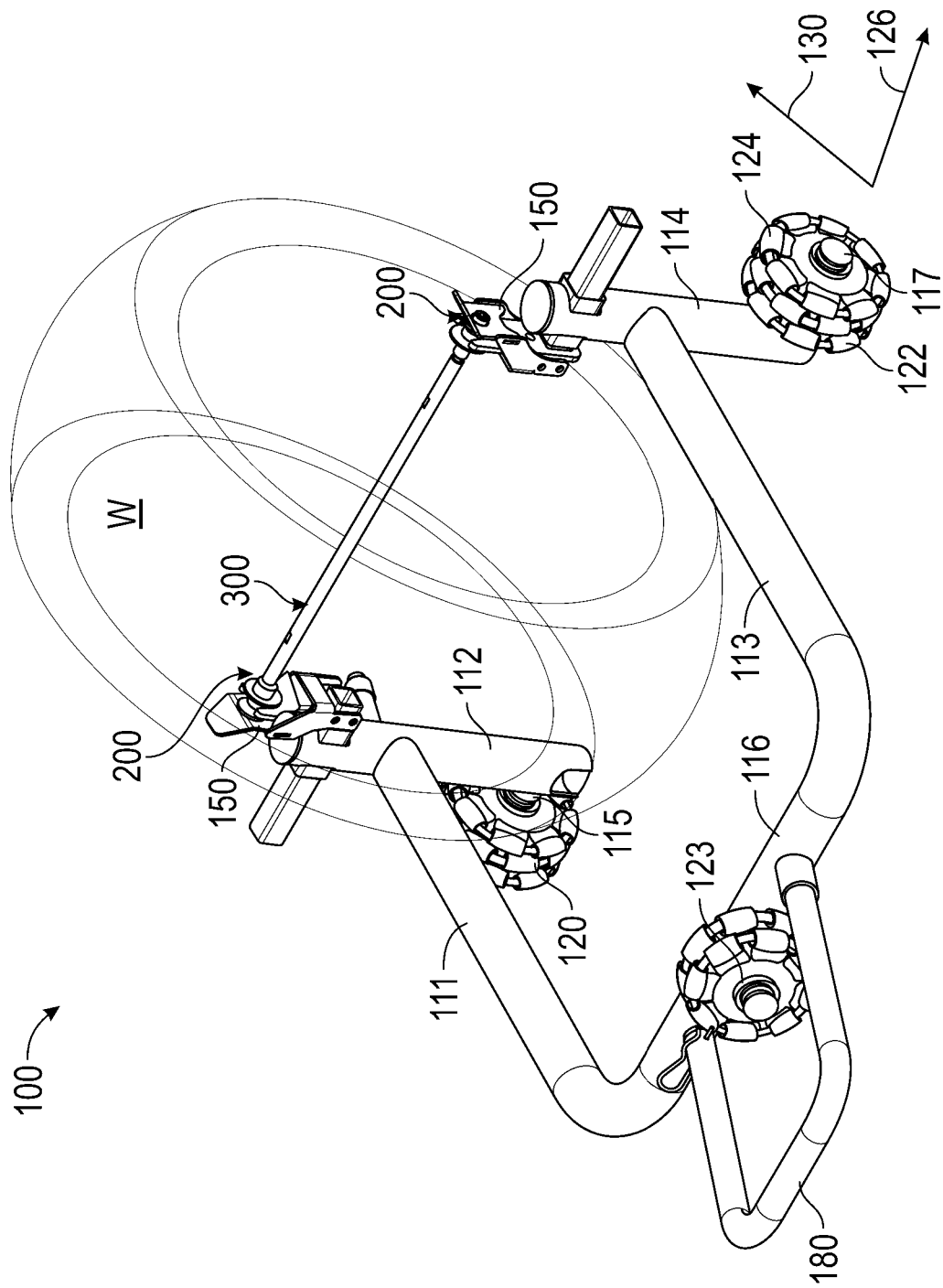
FIG. 6 is a perspective view of the motorcycle stand 100 in which the mounting members 200 have been fully engaged with the bracket 160.
Figure 7:
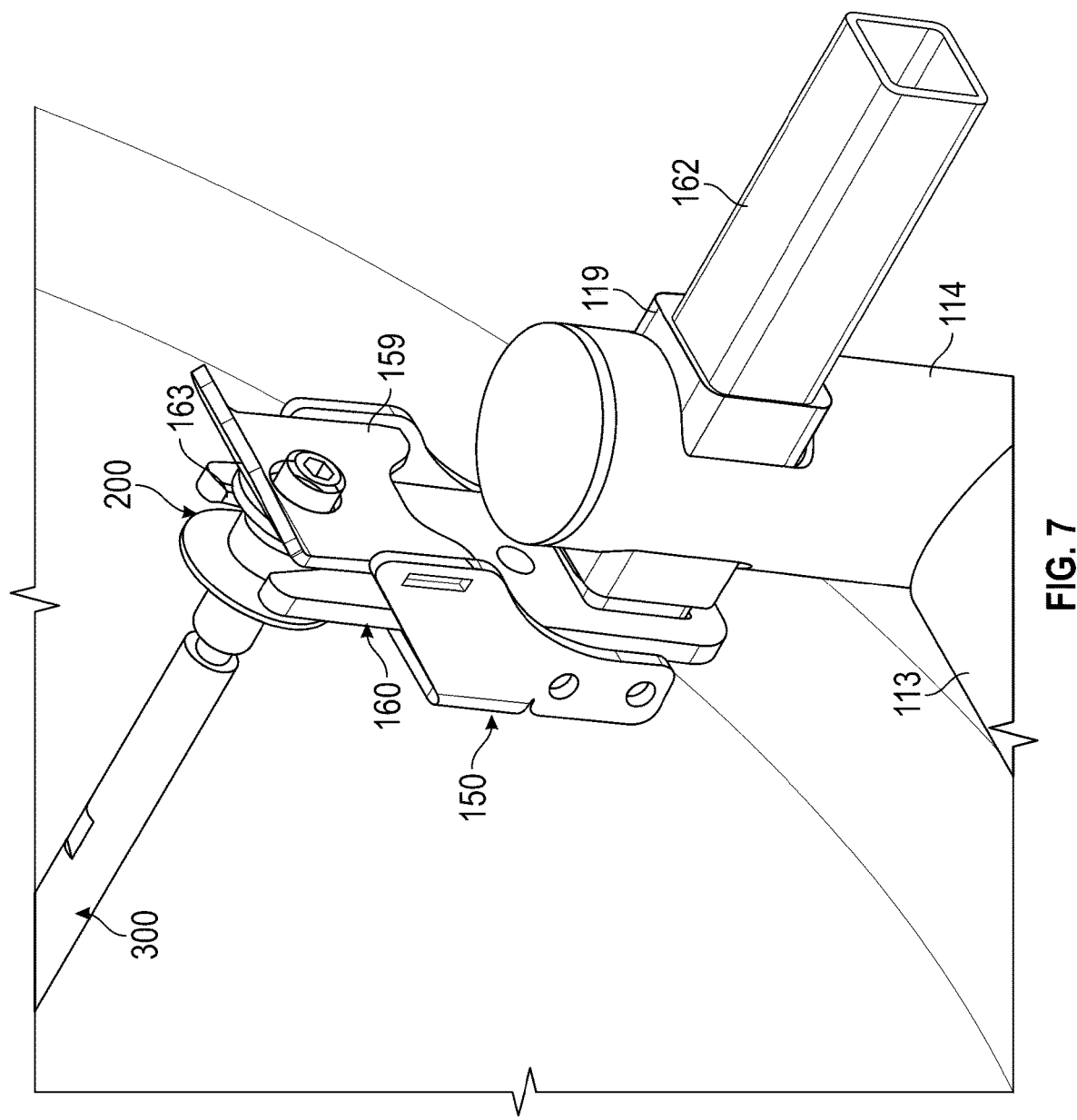
FIG. 7 is an enlarged view of the self-engaging latching arrangement 150 and the bracket 160 shown in FIG. 6.
Figure 8A:
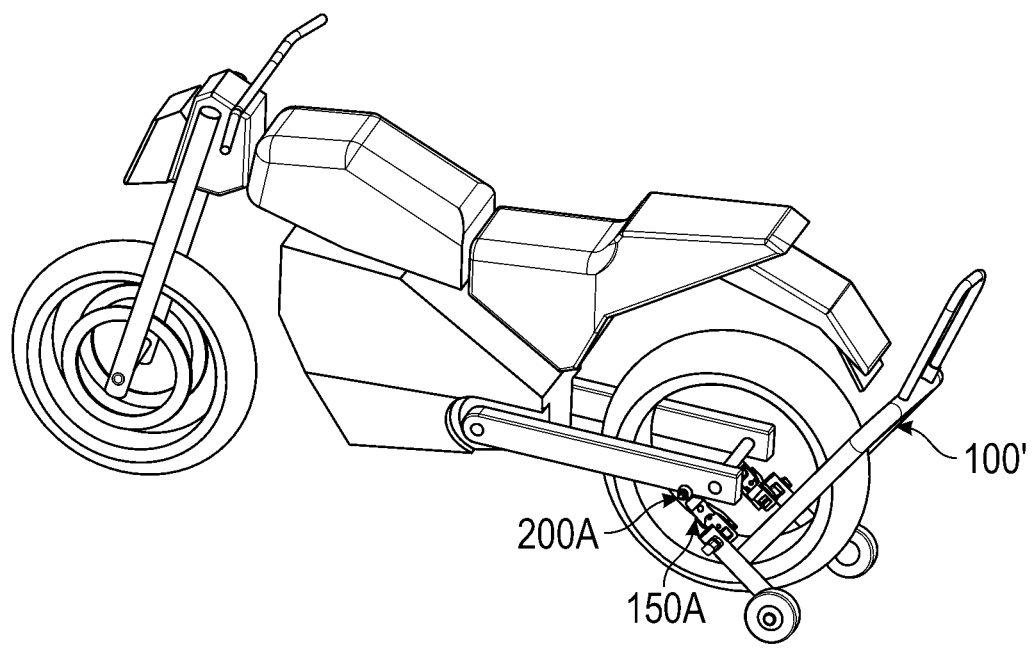
FIGS. 8A and 8B show various views of the motorcycle stand 100 being positioned for engagement with mounting members 200 on the motorcycle.
Figure 8B:
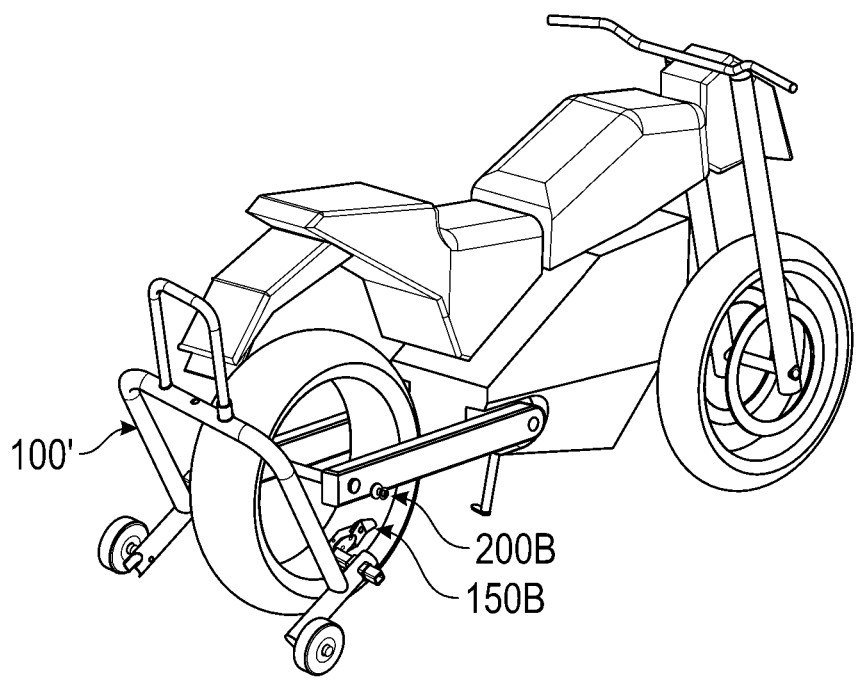
Figure 9A:
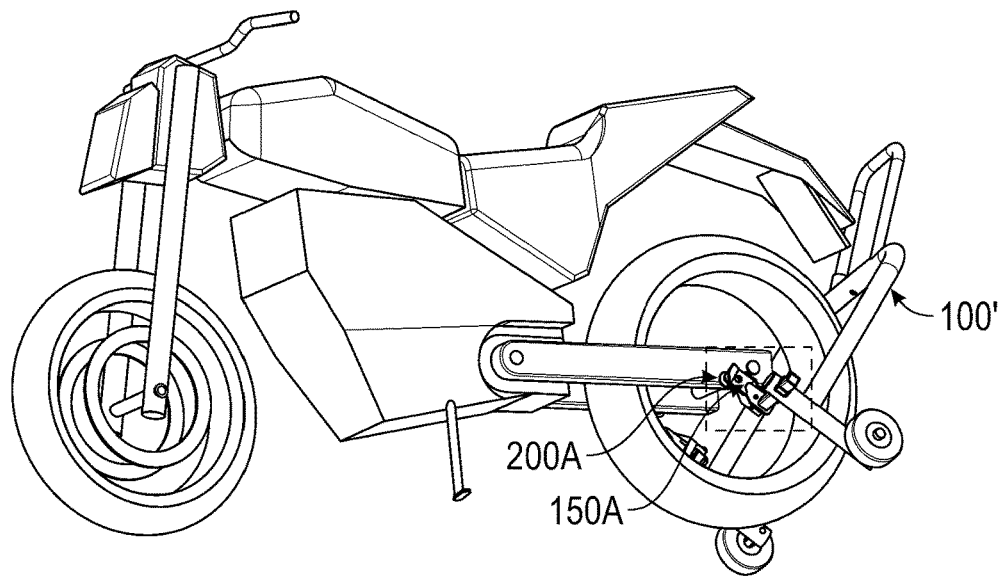
FIGS. 9A to 9C show various views of the motorcycle stand 100 illustrating a first step of engaging one of the mounting members 200 (located on the near side or leaning side of the motorcycle) with the guide plate 154 contacting one of the mounting members 200 where a first latching arrangement 150A is positioned in close proximity of the mounting member 200 but the latching arrangement has not been fully engaged.
Figure 9B:
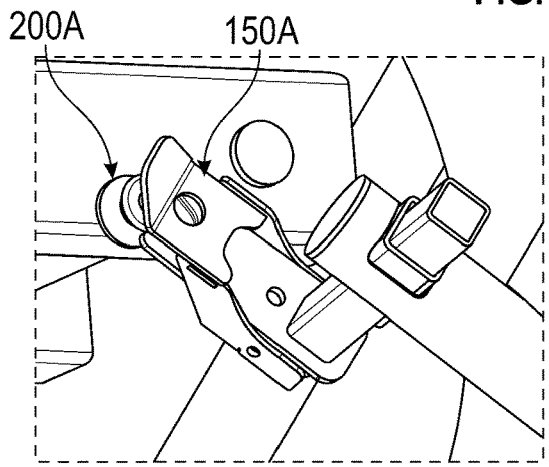
Figure 9C:
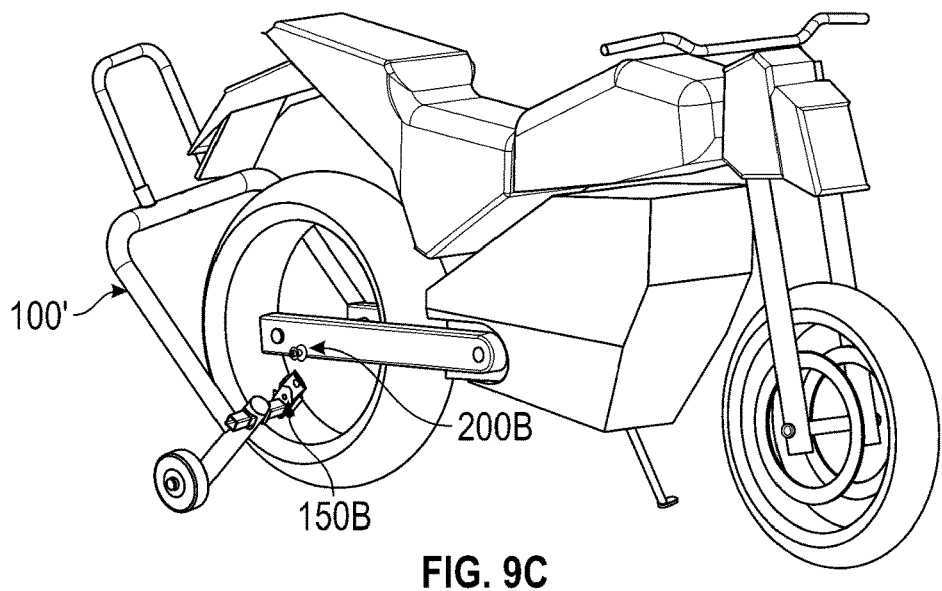
Figure 10A:
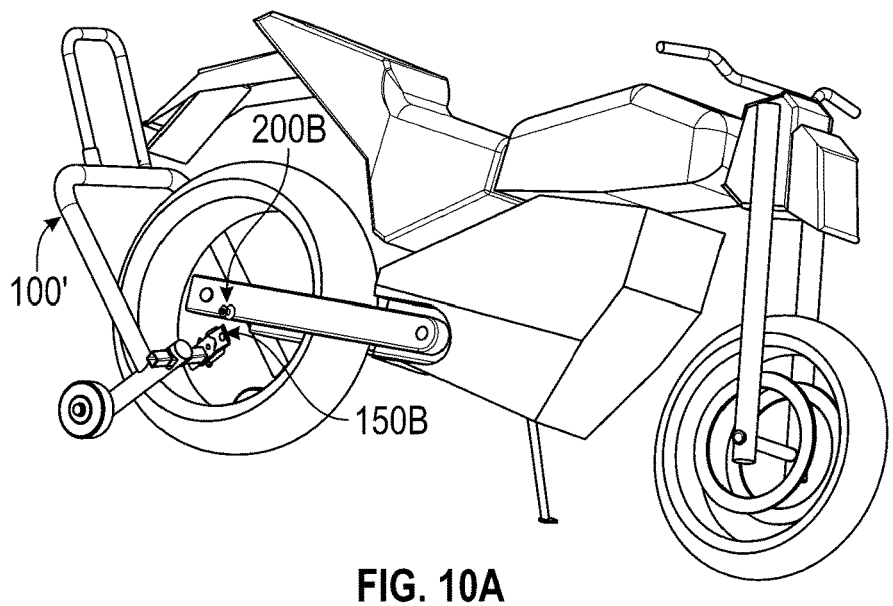
FIGS. 10A to 10C show various views of the motorcycle stand 100 illustrating a second step of fully engaging one of the mounting members 200 (located on the near side or leaning side of the motorcycle) with the first latching arrangement 150A of the motorcycle stand 100.
Figure 10B:
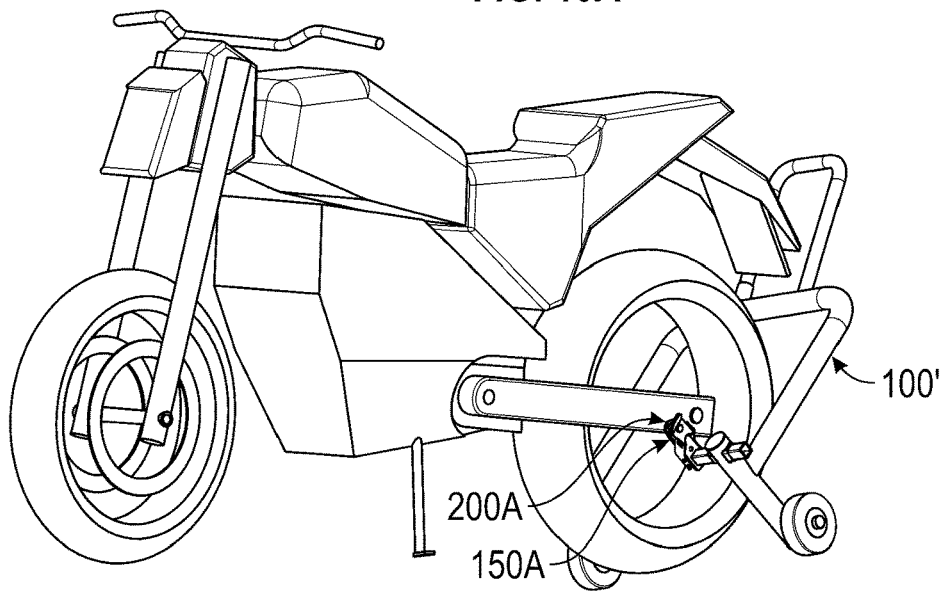
Figure 10C:
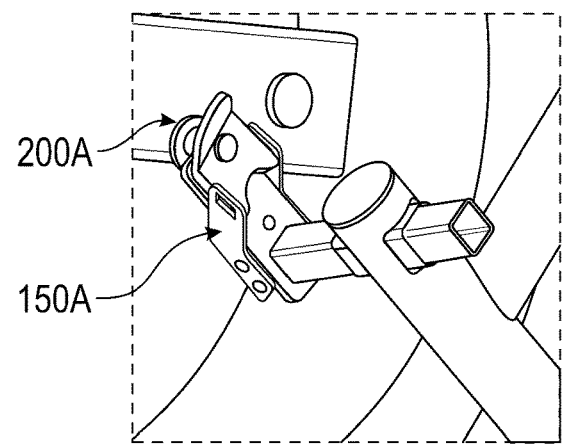
Figure 11A:
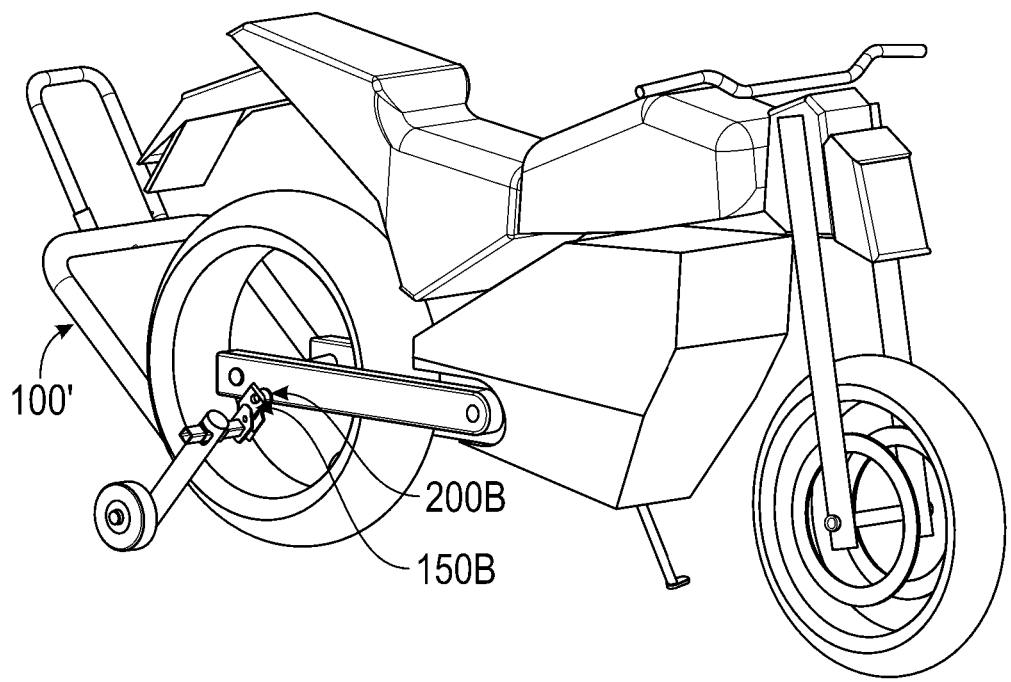
FIGS. 11A and 11B show various views of the motorcycle stand 100 illustrating a third step involving the step of engaging the other of the mounting members 200 (located on the far side or non-leaning side of the motorcycle) with the second latching arrangement 150B whilst the first latching arrangement 150A is maintained in the locked position.
Figure 11B:
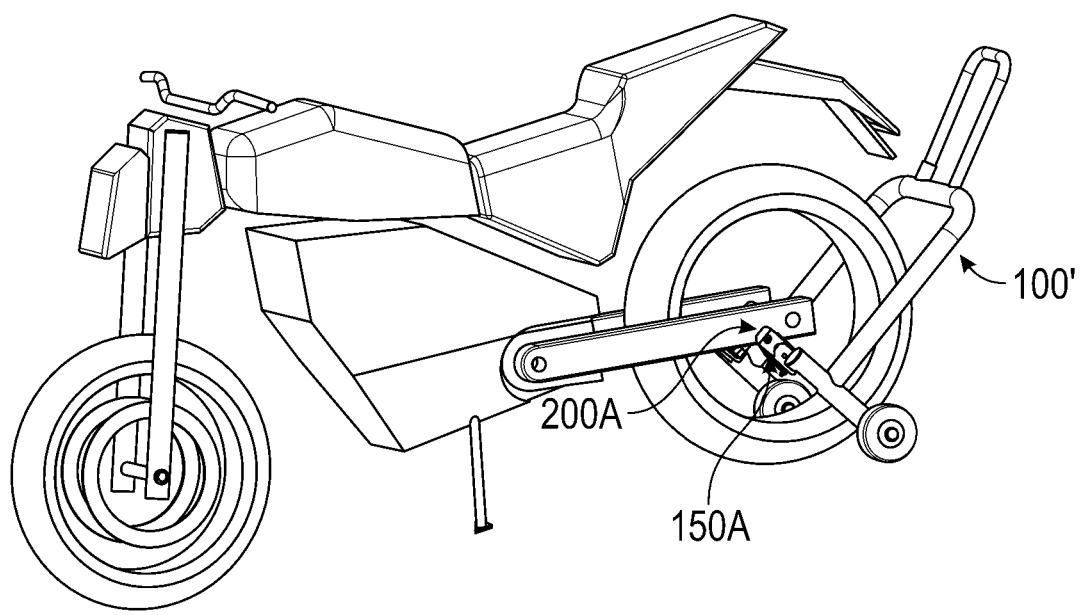

FIGS. 1 to 7 illustrate detailed views of a motorcycle stand 100 that is configured to lift and support a tyre T (shown in FIGS. 1 and 6) of a motorcycle or motor scooter off the ground. The motorcycle stand 100 has a pair of axially aligned wheels 102 and 104 supported by a frame 110. The frame 110 comprises posts 112 and 114 that adapted to extend in a generally upright direction along each side of the motorcycle wheel W. The posts 112 and 114 are interconnected by an interconnecting member 116 that extends transversely relative to the generally upright posts 112 and 114 and is connected to the upright posts 112 and 114 via connecting arms 111 and 113. The upright posts 112 and 114 and the interconnecting member 116 are configured such that the posts 112 and 114 are sufficiently spaced apart to allow a motorcycle or motor-scooter wheel to be received in between the upright posts 112 and 114. In the preferred embodiment, the interconnecting member 116 is formed from bent steel tubing and welded to be integrally formed with the upright posts 112 and 114. It is however envisioned that the frame body 110 may be formed from any other suitable material including non-metallic materials without departing from the spirit and scope of the invention.

Stub axles 115, 117 extend laterally from lower portions of the first and second upright posts 112 and 114, respectively. The stub axles 115, 117 support first and second motorcycle stand wheels 120, 122. The first and second wheels 120, 122 each include peripheral rotatable ground contact members in the form of rollers 124 for motion in direction 126, i.e. parallel to the major axis of each wheel 120 and 122. Consequently, the wheels 120, 122 are able to roll, by means of rollers 124, in direction 126 and also in the conventional manner in direction 130 by rotating about the stub axles 115, 117 and in any direction between axis 126 and 130 (see FIG. 1). A third, optional rear motorcycle stand wheel 123 may also be provided which is mounted to a stub axle 125 that extends from the interconnecting member 116. The third stan wheel 123 is also of a type that includes peripheral rotatable ground members in the form of rollers 24. The wheels 120, 122 and 123 may be seen as omni-directional wheels and can be purchased from Rotacaster Wheel Limited of Tighes Hill, NSW, Australia. This combination of the omni-directional wheels 120, 122 and 123 allow the dolly to move in any horizontal direction. As previously explained in the summary section, the inclusion of omni-directional wheels is optional and is not essential for the working of the invention.

Each of the upright posts 112 and 114, at an in-use upper portion, is provided with a self-engaging latching arrangement 150 that is coupled with a bracket 160. Each bracket 160 is supported on respective upper portion of the posts 112 and 114 on bracket supports 162 that extend transversely relative to the upright posts 112 and 114. During use, each self-engaging latching arrangement 150 and the bracket 160 is positioned to engage mounting members 200 provided on motorcycle or motor-scooter. These mounting members 200 may be provided on mounting locations along the frame of the motorcycle or motorscooter (including but not limited to the swingarm or forks) or in the wheel of the motorcycle or motorscooter. In the preferred embodiment, the mounting members 200 are provided on an axle assembly 300 supporting the rear wheel W of the motorcycle or motor-scooter. The axle assembly 300 and the mounting members 200 in some cases may be provided with the motorcycle stand 100 as a kit for installation on the motorcycle or motor scooter comprising a hollow axle that comprises a suitable bore to receive the axle assembly 300 and position the mounting members 200 on either lateral side of the motorcycle frame as shown in FIG. 1. The bracket supports 162 are movably mounted on the upper portions of the posts 112 and 114 within a hollow holder 119 to allow the bracket 160 and the coupled latching arrangement 150 to be movably disposed in order to be suitably coupled with motorcycle frames of various sizes. For example, the bracket 160 and the coupled latching arrangement 150 may be moved by moving the bracket support 162 in an inwardly or outwardly direction along the hollow holder 119 provided on each of the respective posts 112 and 114 to better engage with the mounting members 200.

We now refer to the detailed views of the self-engaging latching mechanism 150 and the bracket 160 shown in FIGS. 2 to 5. The bracket 160 comprises a bracket body 161 with a slot 163 that includes an opening 165 that is suitably sized to engage with the mounting member 200. Again, the size and shape of the slot 163 and the opening 165 is not limiting and may be modified to better engage with the mounting members 200. In the preferred embodiment, the mounting member 200 comprises a first mounting portion 210 that extends between a proximal flange 212 and a distal flange 214 with the first mounting portion 210 having a cylindrical body with a suitable diameter to be received into the bracket slot 163 through the opening 165. The bracket body 161 is in the form of a bracket plate that extends in an upright configuration to be positioned substantially parallel to the respective posts 112 or 114 they are coupled with. The opening 165 into the slot 163 is provided at an in-use upper portion of the bracket body 161 so that the first mounting portion 210 of the mounting members 200 effectively drops into the slot 163 of the bracket 160.

The provision of the self-engaging latching mechanism 150 assists with engaging the mounting members 200 with the bracket 160 even without achieving perfect alignment between the mounting members 200 and the bracket 160 as will be explained in the foregoing sections. The latching mechanism 150 comprises a latching member 151 mounted on the bracket support 162 via a pivoting arrangement 167 (comprising a pivot pin received into a pivot aperture located on the bracket support 162) to allow the latching member 151 to pivot relative to the bracket 160, in use, towards respective mounting members 200 of the frame of the motorcycle or motor scooter to engage and retain said respective mounting members 200 positioned along the ends of the axle assembly 300. The latching member 151 is biased by way of a spring (not shown) to apply a biasing force to pivot the latching bracket 151 towards the bracket body 161 and generally in a direction towards the mounting members 200 or the frame or body of the motorcycle or motorscooter. The latching member 151 comprises two spaced apart web members 152A and 152B (and generally denoted by 152 throughout the specification) that are dimensioned to receive the width of the bracket body 161 and accommodate the bracket 160 between the web members 152A and 152B. The web members 152A and 152B extend in an orthogonal direction relative to a stop member 153 that extends between the web members 152A and 152B and across the bracket body 161 to connect the web members 152A and 152B. In a neutral position the stop member 153 is positioned in a spaced relationship relative to the bracket body 161 and limits the extent of pivotal movement as the latch member 151 is pivoted away from the bracket body 161.

Each web member 152, at a first lower end 156, is connected to the stop member 153 and at a second upper end 158 is connected with a locking portion in the form of a locking plate 159 comprising a locking aperture 157 that is dimensioned to receive a locking pin 222 extending outwardly from the outer flange 214 of the mounting member 200. The locking plate 159 is substantially parallel to the bracket body 161 in the engaging position (when the first mounting portion 210 is engaged with the bracket slot 163 and the locking pin 222 is received into the locking aperture 157). The latching member 151 also comprises a guiding plate 154 that is formed integrally with the locking plate 159 to guide the mounting members 200, specifically the first mounting portion 210 of the mounting members 200 towards the opening 165 of the bracket slot 163 to effect engagement of the mounting member 200 with the bracket slot 163. The guiding plate 154 comprises a downwardly sloping guiding surface that slopes in a generally inwardly (towards the bracket 160) and downwardly direction (towards the supporting surface upon which the stand 100 is placed) that can receive and guide the locking pin 222 of the mounting member 200 along the guiding surface so that the mounting portion 210 is guided towards the opening 165 of the bracket 160.

Whilst the preferred embodiment describes the requirement of the locking pin 222 of the mounting member 200 to be received into the locking aperture 157 provided on the latching arrangement 150 it must be understood that in some alternative embodiments, the locking pin 222 may be provided on the locking plate 159 and a corresponding locking aperture 157 may be provided adjacent the outer flange 214 of the mounting member 200 for engagement with the locking pin 222 on the locking plate 159.

We now refer to FIGS. 8 to 13 which illustrate sequential steps involved in the use of the motorcycle stand 100' in accordance with another embodiment of the invention. The only difference between the motorcycle stand 100' shown in FIGS. 8 to 13 and the motorcycle stand 100 shown in FIGS. 1 to 7 relates to the absence of the non-essential third wheel 123 provided on the interconnecting member 116 for the motorcycle stand 100'. Like reference numerals denote like features that have been previously described. During use, the motorcycle stand 100 may be initially located to position the upright posts 112 and 114 on either lateral side of the motorcycle frame (as shown in FIGS. 8A and 8B) and the user may adjust the distance between the respective bracket assemblies 160 by moving the bracket supporting member 162 along the respective hollow holders 119 on each of the posts 112 and 114 to align with the mounting members 200. As will be evident from this section, it is important to note that the motorcycle stand 100' (and 100) described herein are particularly useful for safely transferring weight of the motorcycle or motorcycle from its side stand (where the motorcycle is supported in a non-vertical position) to the motorcycle stand 100 (or 100'). It would also be evident that any advantages afforded by the motorcycle stand 100' shown in FIGS. 8 to 13 are also applicable for the motorcycle stand 100 shown in FIGS. 1 to 7. Specifically, the motorcycle stand 100' does not require the user to dangerously balance the bike in a vertical position whilst aligning the mounting members 200 with the brackets 160. Specifically, the self-engaging latching members 150A and 150B allow both mounting members 200 on either lateral side of the motorcycle or motorscooter to engage the mounting members 200 and effectively lock both the mounting members 200 with the brackets 160 and the latching members 151 respectively while the motorcycle or motorscooter is in the slanted position supported on the side stand. The initial step of positioning the upright posts 112 and 114 in close proximity with the mounting members 200 is followed by engaging the first latching arrangement 150A which is in close proximity with a first mounting member 200A that is located on the leaning side or near side of the motorcycle. The configuration of the guide plate 154 guides the mounting member 200A in a downward direction as the locking pin 222 engages with the guiding surface of the guiding plate 154 (as shown in FIGS. 9A to 9C) and travels in a downwardly direction to guide the first mounting portion 210 of the mounting member 200A into the bracket slot 163 (as shown in FIGS. 10A to 10C). The locking aperture 157 is located adjacent a lower portion of the guiding plate 154 to accommodate the locking pin 222 as the first locking portion 210 of the mounting member 200 is pushed into the bracket slot 163. The biased configuration of the latching member 151 continues to apply a biasing force on the locking plate 159 to retain the locking pin 222 within the locking aperture 157. As shown in the accompanying drawings, the latching member 151 extends between a first and a second end with the guiding plate 154 at the first upper end of the latching plate 151 with the second lower end of the latching plate 151 having a pivot assembly 167 (as explained earlier) to pivot relatively to the bracket support 162. Once one of the mounting members 200A on the near side of the motorcycle has been locked with the first latching arrangement 150A, the user can continue to let the motorcycle remain supported on the side stand in a non-vertical position while moving the second latching arrangement 150B towards the second mounting member 200B located on the far side or non-leaning side of the motorcycle. It is important to note that in the previous step, only mounting member 200A was fully engaged with latching arrangement 150A whilst mounting member 500B was not fully engaged with the second latching arrangement 150B. FIGS. 11A and 11B illustrate the next step of using the motorcycle stand 100' with the first and second mounting members 200A and 200B being fully engaged and locked with the first and second latching arrangements 150A and 150B respectively. It would be readily evident that the manner in which the second latching arrangement 150B engages the second mounting member 200B is similar to manner in which the first latching arrangement 150A engages the first mounting member 200A.

Figure 12B:
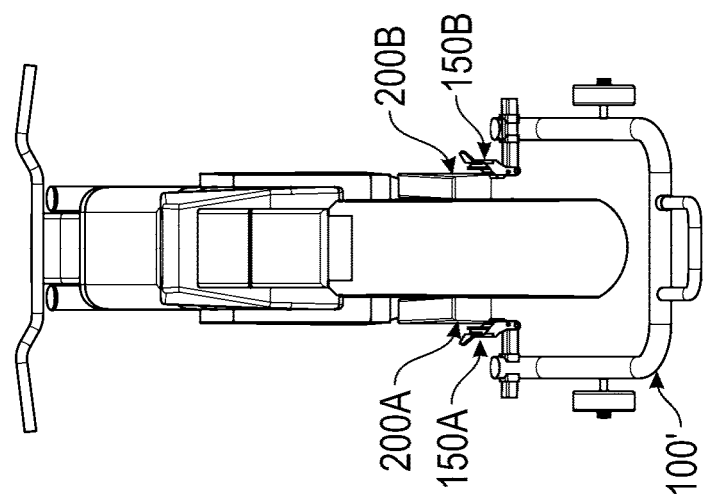
FIGS. 12A and 12B show the motorcycle stand 100 in a fully engaged and lifted position where the rear wheel of the motorcycle is being fully supported by the motorcycle stand 100.
Figure 12A:
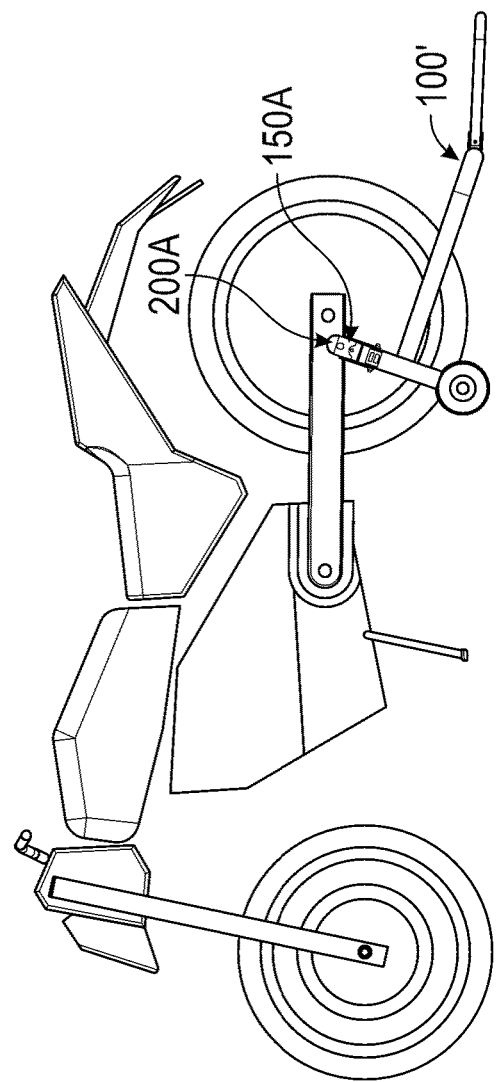

Once both mounting members 200 have become engaged and locked with the bracket 160 and the biased latching arrangement 150, the user may use a handle 180 attached with the interconnecting member 116 to push the interconnecting member 116 in a generally downward direction whilst simultaneously pushing laterally on the motorcycle which results in the upright posts (112, 114) and the interconnecting member 116 pivoting about wheels 122 and 124 to firstly bring the off-side wheel 124 in contact with the floor and the motorcycle to the vertical position. If the user continues to push down on the handle 180, the stand 100 will continue to rotate about wheels 122 and 124, the motorcycle wheel W will be raised above the floor and the motorcycle will then be in a raised and upright configuration as shown in FIGS. 12A and 12B.

In order to remove the motorcycle stand 100', the procedure described in paragraph 037 is simply reversed: the stand 100 is rotated about wheels 122 and 124 by raising the handle 180 until the motorcycle tyre is again in contact with the floor, with the motorcycle still held vertical and controlled by the user's hold on the handle. The motorcycle may then be leaned over until its side-stand again rests on the floor. The user may pivot the latching plate 151 in an outwardly direction away from the bracket body 161 by applying a force that acts against the bias provided by the biasing spring 155 and then lift the handle 180 of the interconnecting member 116 in an upwardly direction to disengage the mounting members 200 from the bracket slot 163.

The self-engaging latch 150 in combination with the bracket 160 prevents the mounting members 200 from becoming disengaged while the user is trying to transfer the motorcycle's weight from the side stand to the upright posts 112 and 114 while pushing the handle 180 in the downwardly direction. As the upright posts 112 and 114 are pivoted in a downwardly direction into a supporting position (by pushing the handle 180 downwards), the weight of the motorcycle or motorscooter frame continues to push the mounting members 200 in a downwardly direction to maintain engagement between the first mounting portion 210 of the mounting member 200 with the bracket slot 163 for each bracket 160 (located adjacent a respective latching member 151). The biased guiding plate 154 retains the stand locking pin 222 within the locking plate 159 and prevents the stand 100 from becoming completely disengaged from the mounting members 200. The locking pin 222 may be in the form of the head of a bolt or screw with a head that may be suitably sized to pass through the locking aperture 157 of the locking plate 159.

In some alternative embodiments, a mechanical arrangement may be provided to engage and hold the latching member 151 in an outwardly pivoted position (against the bias applied by the biasing spring 155) to allow disengagement of the mounting member 200 from the bracket 160.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A motorcycle stand configured to lift and support a wheel and/or axle of a motorcycle or motor scooter off the ground, the motorcycle stand comprising:
   a frame having first and second posts configured to extend along each side of a motorcycle wheel, and an interconnecting member extending transversely relative to the first and second posts; first and second motorcycle stand wheels coupled to ends of the first and second posts respectively and arranged for placement on opposite sides of the motorcycle; and
   a self-engaging latching arrangement coupled with a respective frame engaging bracket, wherein at least one of each frame engaging bracket and self-latching arrangement is supported on each of said first and second posts to engage mounting members provided on said motorcycle or motor scooter;
wherein the self-engaging latching arrangement comprises a latching member mounted relative to the bracket to pivot, in use, towards respective mounting members of the frame of the motorcycle or motor scooter, the latching member comprising a guiding plate for guiding said mounting members into the bracket and thereby engage and retain said respective mounting portions of the frame.

2. The motorcycle stand in accordance with claim 1, wherein the latching member is biased to pivot towards the bracket.

3. The motorcycle stand in accordance with claim 1, wherein the guiding plate is angled relative to the plane of the bracket to slope in a downwardly and inwardly direction towards the frame engaging portion of the bracket to guide the mounting member towards the frame engaging portion of the bracket.

4. The motorcycle stand in accordance with claim 1, wherein the self-engaging latching arrangement further comprises a locking portion positioned adjacent said guiding plate such that upon engagement of the bracket with a first mounting portion of the mounting member, a second mounting portion of the mounting member is received and retained in said locking portion under biasing force applied by the biased latching plate.

5. The motorcycle stand in accordance with claim 1, wherein the latching member extends between a first end and a second end such that the guiding portion is located at the first end and wherein the second end of the latching member being pivotally attached relative to the bracket to effect the pivotal movement of the guiding portion.

6. The motorcycle stand in accordance with claim 1, wherein the latching member comprises two spaced apart web members dimensioned to accommodate the bracket there-between.

7. The motorcycle stand in accordance with claim 6, wherein the web members extend transversely relative to a stop member connecting said web members wherein the stop member is positioned to limit extent of pivotal movement of the latch member in a direction away from the wheel, during use.

8. The motorcycle stand in accordance with claim 7, wherein each web member, at a first end is connected with the stop member and the pivoting portion, and, at a second end, is connected with said locking portion.

9. The motorcycle stand in accordance with claim 8, wherein the second end of the web member, during use, is located at an elevated position relative to the first end of the web member.

10. The motorcycle stand in accordance with claim 9, wherein the guiding plate is at a higher elevation relative to the locking portion to guide the mounting member along a guiding surface of the guiding in an in-use downwardly direction towards the frame engagement portion of the bracket.

11. The motorcycle stand in accordance with claim 1, wherein each bracket is supported on a bracket supporting member extending relative to the first or second post.

12. The motorcycle stand in accordance with claim 1, wherein the bracket supporting member extends transversely relative to in-use upper portions of the first or second posts.

13. The motorcycle stand in accordance with claim 11, wherein the latching member is pivotally attached to the bracket supporting member.

14. The motorcycle stand in accordance with claim 1, wherein the mounting member comprises a spool configured for being received into a spool receiving slot through an opening provided at an in use upper portion of the bracket.

15. The motorcycle stand in accordance with claim 14, wherein the first mounting portion is defined by a proximal flange and a distal flange with a bracket engaging surface extending therebetween.

16. A motorcycle stand in accordance with claim 14, wherein the second mounting portion comprises a locking pin projecting outwardly relative to the distal flange, the locking pin being dimensioned to be received and retained in the locking portion of the latching member.

17. The motorcycle stand in accordance with claim 14, wherein in at least one operable configuration, the latching portion is biased to retain the locking pin in the locking portion of the latching member.

18. The motorcycle stand in accordance with claim 1, wherein the mounting members are mounted on an axle assembly supporting one of said wheels of the motorcycle or motor scooter.

19. The motorcycle stand in accordance with claim 1, wherein the third motorcycle stand wheel mounted to the spacing member includes peripheral rotatable ground contact members for motion parallel to the major axis of the wheel.

20. The motorcycle stand in accordance with claim 1, wherein the first, second and third motorcycle stand wheels comprise omni-directional wheels for motion in any horizontal direction.

21. The motorcycle stand in accordance with claim 1, wherein the first and second posts are coaxial and aligned with the major axis parallel with the axes of the motorcycle wheels.

* * * * *